United States Patent [19]

Thompson

[11] Patent Number: 4,517,885

[45] Date of Patent: May 21, 1985

[54] WIENER ROASTER

[76] Inventor: Elmer E. Thompson, Box 662, Sayer, Okla. 73662

[21] Appl. No.: 591,065

[22] Filed: Mar. 19, 1984

[51] Int. Cl.³ .............................................. A47J 37/04
[52] U.S. Cl. ................................. 99/421 HV; 99/441; 99/449
[58] Field of Search .................. 99/419, 421 R, 421 A, 99/421 H, 421 HV, 448, 441, 449; 426/523

[56] References Cited

U.S. PATENT DOCUMENTS

| | | | |
|---|---|---|---|
| 2,191,226 | 2/1940 | Clem | 99/419 X |
| 2,535,548 | 12/1950 | Porter | 99/421 R |
| 2,649,042 | 8/1953 | Wickman | 99/441 |
| 3,745,910 | 7/1973 | Delamater | 99/419 |
| 3,946,653 | 3/1976 | Pugh | 99/441 X |

FOREIGN PATENT DOCUMENTS 189374  11/1922  United Kingdom .............. 99/421 A Primary Examiner—Billy J. Wilhite
Attorney, Agent, or Firm—John H. Widdowson

[57] ABSTRACT

A wiener roaster having a shank including a first section threadably attached to a second section. A plurality of tines is integrally bound to the first section. A bearing collar rotatably slidably attaches to the first section. A first handle is bound to an end of the second section for gripping the wiener roaster. A second handle is slidably rotatably positioned about the second section in an area between the threadably securing point of the first section to the second section and the first handle. A stand is provided to be implanted in a ground. The stand has a structure defining a bifurcated bearing face wherein the bearing collar removably rotatably lodges as the tines impale wieners and is rotatably situated over a fire, or the like. A method for roasting wieners includes impaling at least one wiener on a tine pivotably secured at the end of a first shaft of a fold-up wiener roaster having a second shaft pivotably secured to the first shaft. The method additionally includes positioning the impaled wiener over a fire, or the like, and rotating the positioned impaled wiener over the fire to evenly roast the wiener.

8 Claims, 15 Drawing Figures

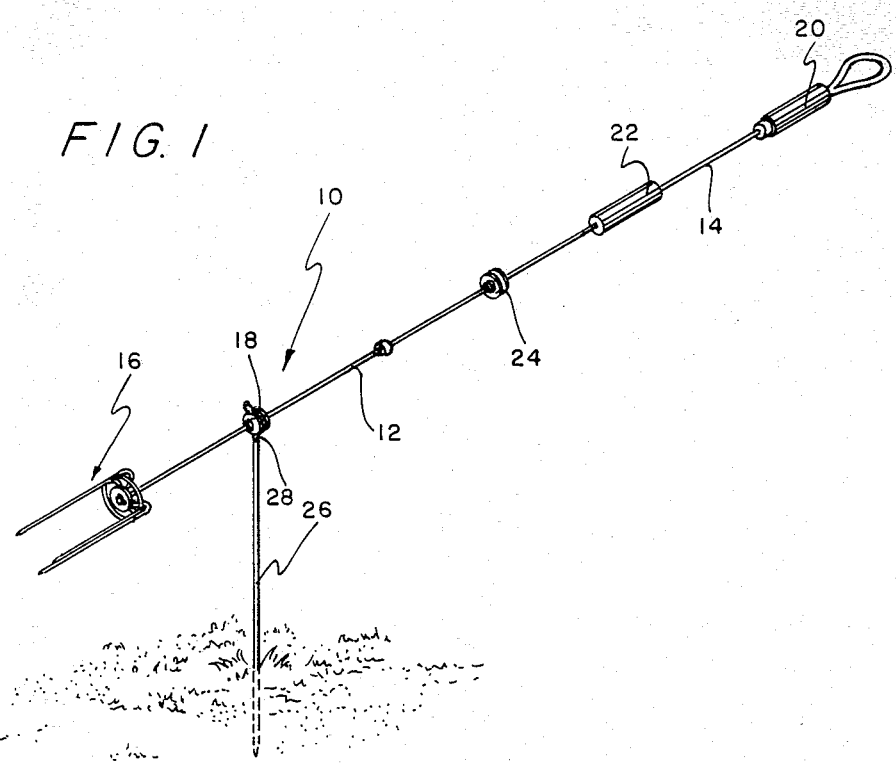
FIG. 1
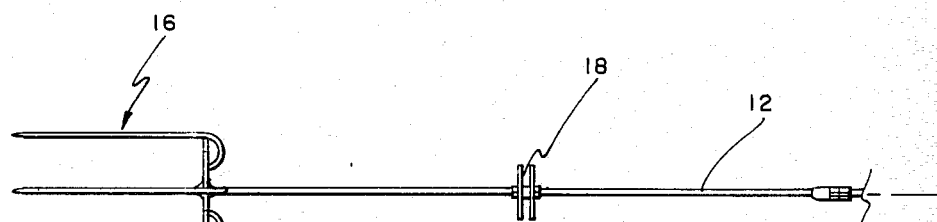
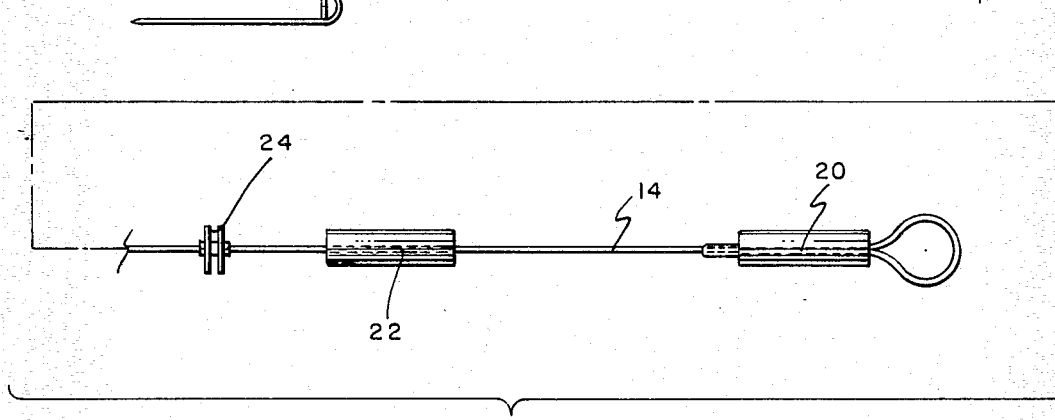
FIG. 2

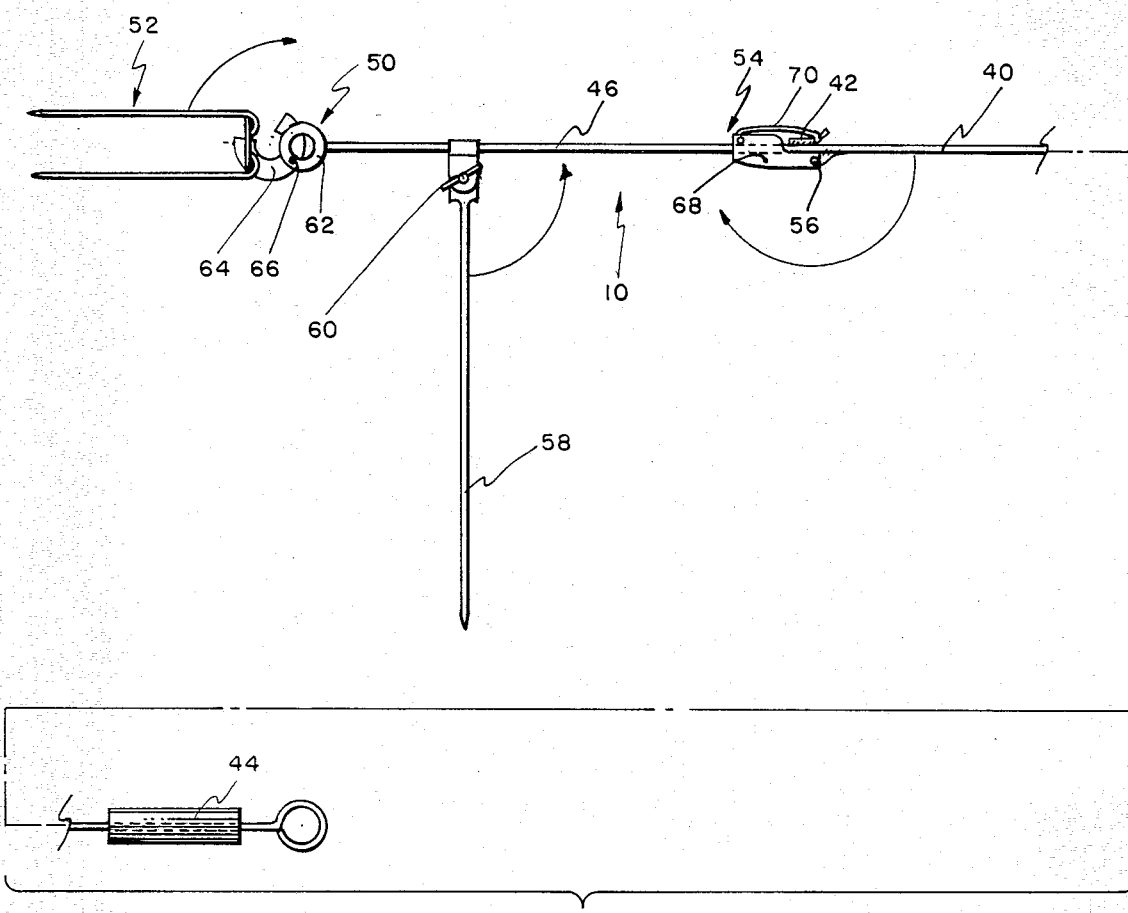
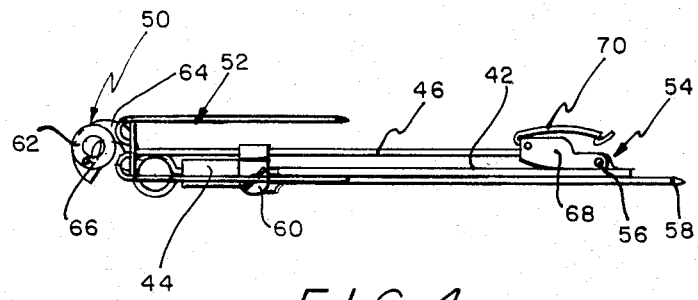

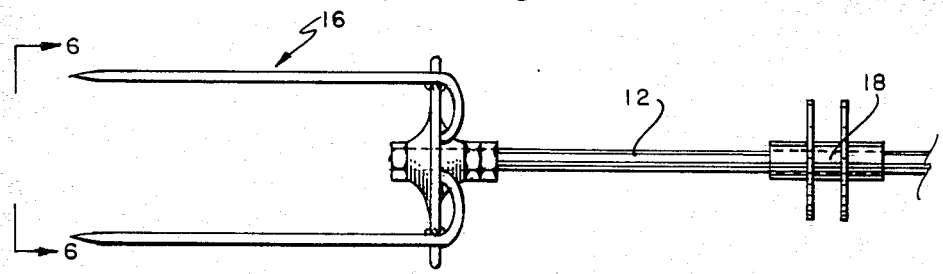
FIG. 5
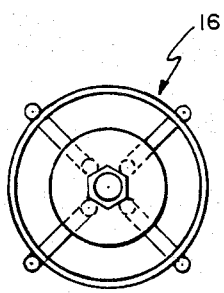
FIG. 6
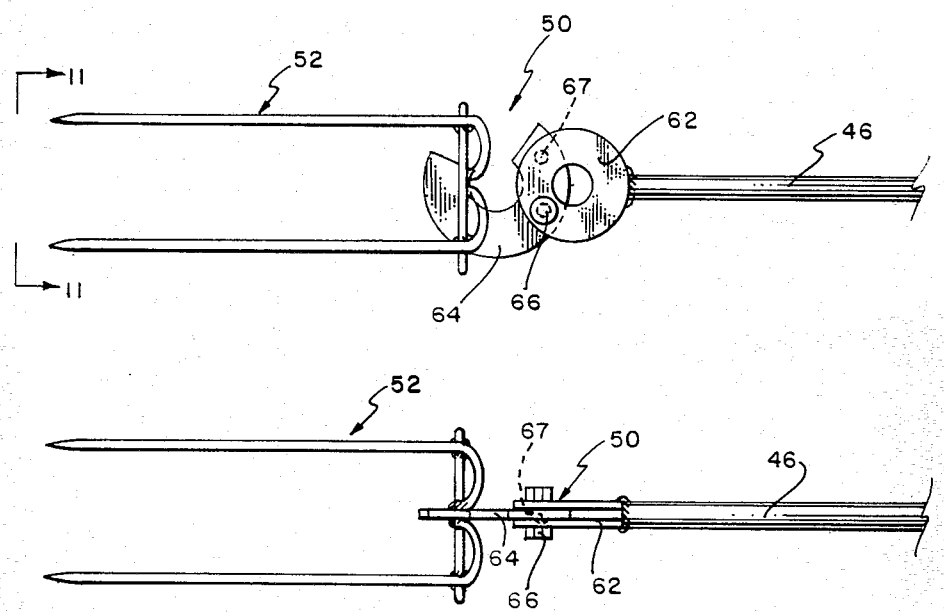
FIG. 7
FIG. 8

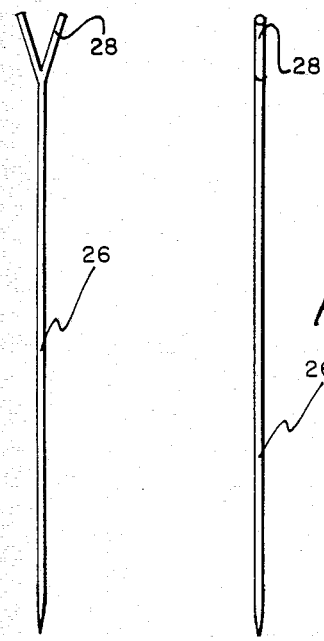
FIG. 9
FIG. 10
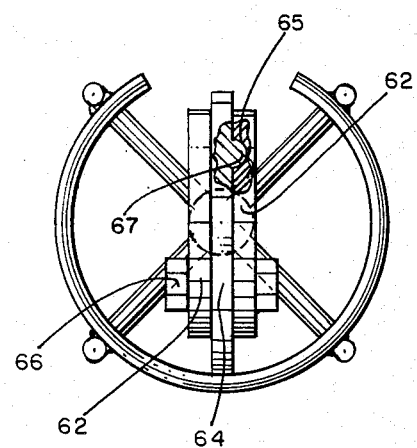
FIG. 11
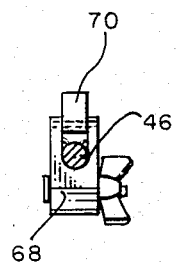
FIG. 14
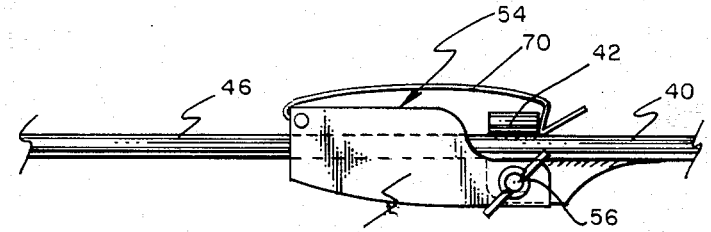
FIG. 12
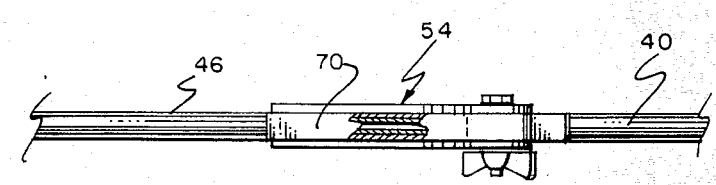
FIG. 13
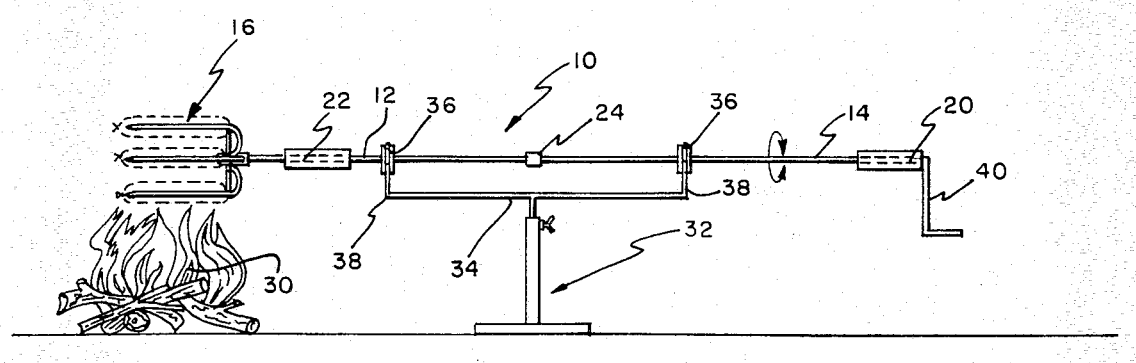
FIG. 15

WIENER ROASTER

BACKGROUND OF THE INVENTION

1. Field of the Invention

This invention provides a wiener roaster. More specifically, this invention contemplates a fold-up wiener roaster.

2. Description of the Prior Art

U.S. Pat. No. 2,649,042 by Wickman discloses a holder for a plurality of hot dogs. Wickman's holder includes a handle that is provided to be gripped by the user and the shank of the holder extending through the handle and terminating in a crank portion. The roaster is relatively rotatable with respect to the handle wherein the handle may be gripped and the crank turned so as to rotate the holder having the hot dogs therein for even cooking. U.S. Pat. No. 3,946,653 by Pugh discloses a hot dog roaster that has means for impaling a plurality of hot dogs and which is rotatably supported in a stand so that the holder may be rotated by means of a handle to evenly cook the hot dogs. U.S. Pat. No. 2,191,226 by Clem teaches a roasting fork having an ejector means thereon and also means whereby the roaster may be rotated by turning the handle while holding slidable members which function as a means to operate the ejector plate. U.S. Pat. No. 2,535,548 by Porter teaches a roasting spit for hot dogs or the like that is foldable and which includes a handle that may be held by the user while rotating the inner shaft member holding the hot dogs. None of the foregoing prior art teach or suggest the wiener roaster or the method for roasting wieners of this invention.

SUMMARY OF THE INVENTION

This invention accomplishes its desired objects by providing a wiener roaster comprising a shank means including a first section threadably attached to a second section. A tine means is integrally bound to the first section. A bearing collar means is rotatably slidably attached to the first section, and the first handle means is bound to an end of the second section for gripping the wiener roaster. A second handle means is slidably rotatably positioned about the second section in an area between the threadably securing point of the first section to the second section and the first handle means. A stand means is provided to be implanted in a ground and has a structure defining a bifurcated bearing face wherein the bearing collar means romovably rotatably lodges as tine means impales wieners and is rotatably situated over a fire, or the like. This invention additionally accomplishes its desired objects by providing a novel method of roasting wieners by impaling at least one wiener on a tine means pivotably secured at the end of a first shaft means of a fold-up wiener roaster having a second shaft means pivotably secured to the first shaft means. The method additionally comprises positioning the impaled wiener over a fire, or the like, and rotating the positioned impaled wiener over the fire to evenly roast the wiener.

It is an object of the invention to provide a novel wiener roaster which is capable of easily being assembled and disassembled and stored.

Still further objects of the invention reside in a wiener roaster which can be easily transported, and is relatively inexpensive to manufacture.

These together with the various ancillary objects and features will become apparent as the following description proceeds, are attained by this invention, preferred embodiments being shown in the accompanying drawings, by way of example only, wherein:

BRIEF DESCRIPTION OF THE DRAWINGS

FIG. 1 is a perspective view of one embodiment of the wiener roaster;

FIG. 2 is an enlarged broken view of the embodiment of the wiener roaster of FIG. 1.

FIG. 3 is an enlarged broken side elevational view of another embodiment of the wiener roaster:

FIG. 4 is a folded-up view of the embodiment of the wiener roaster if FIG. 3.

FIG. 5 is an enlarged partial top plan view of the plurality of tines and a bearing collar;

FIG. 6 is a front elevational view of the tines taken in direction of the arrows and along the plane of line 6—6 in FIG. 5:

FIG. 7 is a partial side elevational view of the tines for the embodiment of the wiener roaster of FIG. 3.

FIG. 8 is a top plan view of the tines of the embodiment of the wiener roaster of FIG. 3.

FIG. 9 is a front elevational view of the stand;

FIG. 10 is a side elevational view of a stand;

FIG. 11 is a front elevational view of the tines of the embodiment of the wiener roaster depicted in FIG. 3 and is taken in direction of the arrows and along the plane of line 11—11 in FIG. 7;

FIG. 12 is an enlarged front elevational view of the clamp which locks the first section of the shank with the second section of the shank;

FIG. 13 is a top plan view of the lock means of FIG. 12:

FIG. 14 is an end elevational view of the locking means of FIGS. 12 and 13; and

FIG. 15 is a front elevational view of the wiener roaster of the embodiment of FIG. 1 mounted on a stand in order that the tines impaling wieners can be rotated over a fire.

DETAILED DESCRIPTION OF THE INVENTION

Referring now in detail to the drawings, wherein like reference numerals designate similar parts throughout the various views, and presently in particular to the embodiment of FIG. 1, there is seen a wiener roaster, generally illustrated as 10, having a shank comprising a first section 12 threadably attached to a second section 14. A tine means, generally illustrated as 16, is integrally bound to the first section 12. A bearing collar 18 is rotatably slidably attached to the first section 12. Handle 20 is bound to an end of the second section 14 for gripping the wiener roaster 10. A second handle 22 is slidably rotatably positioned about the second section 14 in an area between a threadably securing point 24 (see FIG. 1) of the first section 12 and the second section 14 and the handle 20. A stand 26 is implanted in a ground and has a structure defining bifurcated bearing face 28 (see FIG. 9). The bearing collar 18 removably rotatably lodges in the bifurcated bearing face 28 as the tine means 16 impales wieners and is rotatably situated over a fire 30 (see FIG. 15), or the like.

A variation of the embodiment of FIG. 1 is seen in FIG. 15. The handle 22 is slidably rotatably positioned about the first section 12 instead of the second section 14. Also, a stand, generally illustrated as 32, is provided and includes a pair of arms 38—38. The stand 32 comprises a generally U-shaped shank guide means 34 having a structure defining a pair of slide-through keepers 36—36 at the end of its arms 38—38. The first section 12 and the second section 14 rotatably slidably pass through the pair of keepers 36—36. A crank 40 is connected to the handle 20 to facilitate rotating the wiener roaster 10 when the tine means 16 is positioned over the fire 30 to roast wieners represented as dotted lines.

A preferred embodiment of the wiener roaster 10 is illustrated in FIG. 3. The wiener roaster 10 comprises a first shank 40 having a structure defining an integrally bound protrusion 42 (see FIG. 12). A handle 44 is rotatably slidably positioned about the first shank 40. The wiener roaster 18 of the embodiment of FIG. 3 also includes a second shank 46. A pivotation bearing means, generally illustrated as 50, is bound to one end of the second shank 46. A tine means, generally illustrated as 52, is secured to the pivotation bearing means 50 in order for the same to pivot the tine means 52 about the second shank 46. A locking clamp means, generally illustrated as 54, is secured to the other end of the second shank 46 and defines a pivotation point 56 for the first shank 42 about the second shank 46. The wiener roaster 10 of the preferred embodiment in FIG. 3 additionally comprises a shaft 58 and a sleeve 60 which is pivotably connected to the shaft 58. The pivotation of the shaft 58 to the sleeve 60 enables the shaft 58 to be folded towards the second shank 46.

The pivotation bearing means 50 comprises a first bearing plate 62 stationarily affixed to the second shank 46 (see FIG. 7). A second bearing plate 64 connects to the tine means 52 and is pivotably attached to the first bearing plate at 66. A recess 65 is provided in the structure of the bearing plate 62 and a lug 67 is integral to the second bearing plate 64 (see FIG. 11). Lug 67 of second bearing plate 64 seats in the recess 65 of the first bearing plate 62 to define a locking means which cooperates between the two bearing plates 62, 64 to releasably lock the two together when the tine means 52 is pivoted away from the second shank 46 and is positioned for impaling wieners to be roasted.

The locking clamp means 54 comprises a base pivotation member 68 whereupon the first shank 40 pivotably attaches at 56. A clamp 70 is pivotably connected to an end of the base pivotation member 68 and lodges behind the protrusion 42 to lock the first shank 40 and the second shank 46 together.

With continuing reference to the drawings for operation of the preferred embodiment of the invention at least one wiener is impaled on the tine means 52 which is secured to the second bearing plate 64 of the pivotation bearing means 50. First bearing plate 62 of pivotation bearing means 50 is pivotably attached to the second bearing plate 64 at point 66 and is also bound to the second shank 46. First shank 40 is pivotably attached at 56 to the locking clamp means 54 which engages the other end of the second shank 46. The wiener impaled by tine means 52 is positioned over the fire 30 and is slowly rotated over the same to evenly roast the wiener. After the wiener is roasted, it is removed for consumption. The wiener roaster 10 may subsequently be folded-up by pivoting the tine means 52 via the pivotation bearing means 50 and the first shank 40 via the locking clamp means 54 about the second shank 46 to fold-up the wiener roaster 10 for carrying or storing. The shaft 58 may also be pivoted toward the second shank 46 for carrying. This is accomplished by merely removing the shaft 58 from the ground and pivoting the same about the sleeve 60 towards the second shank 46. The wiener roaster 10 is now folded-up in the position illustrated in FIG. 4.

While the present invention has been described herein with reference to particuar embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A wiener roaster comprising a shank means including a first section threadably attached to a second section at a threadably securing point;
    a tine means integrally bound to said first section;
    a bearing collar means rotatably slidably attached to said first section;
    a first handle means bound to an end of said second section for gripping the wiener roaster;
    a second handle means slidably rotatably positioned about said second section in an area between the threadably securing point of said first section to said second section and the first handle means; and
    a stand means to be implanted in a ground and having a structure defining a bifurcated bearing face wherein said bearing collar means removably rotatably lodges as tine means impale wieners and is rotatably situated over a fire, or the like.

2. A wiener roaster comprising a shank means including a first section threadably attached to a second section;
    a tine means integrally bound to said first section:
    a first handle means bound to an end of said second section for gripping the wiener roaster;
    a second handle means slidably rotatably positioned about said first section; a stand means; and
    a generally U-shaped shank guide means slidably telescopically engaging said stand means and having a structure defining a pair of slide-through keeper means at the end of its arms wherethrough said shank means rotatably slidably passes.

3. A fold-up wiener roaster comprising a first shank means having a structure defining an integrally bound protrusion means at one of its ends;
    a handle means rotatably slidably positioned about said first shank means;
    a second shank means;
    a pivotation bearing means bound to one end of said second shank means;
    a locking clamp means secured to the other end of said second shank means and defining a pivotation point for said first shank means about said second shank means; and
    a tine means secured to said pivotation bearing means in order for said bearing means to pivot said tine means about said second shank means.

4. The fold-up wiener roaster of claim 3 additionally comprising a shaft means having a structure defining a sleeve means wherethrough said second shank means passes.

5. The fold-up wiener roaster of claim 4 wherein said pivotation bearing means comprises a first bearing plate stationarily affixed to said second shank means;
    a second bearing plate connected to said tine means and pivotally attached to said first bearing plate;

a locking means cooperating between the two bearing plates to releasably lock the two together when the tine means is pivoted away from the second shank means and is in position for impaling wieners to be roasted.

6. The fold-up wiener roaster of claim 5 wherein said locking means is defined by a recess in the structure of said first bearing plate and a lug integral to said second bearing plate and seated in said recess when said tine means is pivoted away from said shank means.

7. The fold-up wiener roaster of claim 6 wherein said locking clamp means comprises a base pivotation member whereupon said first shank means pivotally attaches and a clamp pivotally connected to an end of said base pivotation member and lodging behind said protrusion means to lock the first shank means and the second shank means together.

8. The fold-up wiener roaster of claim 7 wherein said shaft means is pivotally connected to its defined sleeve means in order to be folded towards said second shank means.

* * * * *